United States Patent
Seidel et al.

(10) Patent No.: US 9,649,726 B2
(45) Date of Patent: May 16, 2017

(54) METHOD FOR MONITORING A LATERAL OFFSET OF AN ACTUAL WELD SEAM CONFIGURATION RELATIVE TO A DESIRED WELD SEAM CONFIGURATION, ASSEMBLY AND MOTOR VEHICLE SEAT

(75) Inventors: Torsten Seidel, Windischholzhausen (DE); Christof Bladowski, Neustadt bei Coburg (DE)

(73) Assignee: Brose Fahrzeugteile GmbH & Co., Kommanditgesellschaft, Coburg, Coburg (DE)

( * ) Notice: Subject to any disclaimer, the term of this patent is extended or adjusted under 35 U.S.C. 154(b) by 615 days.

(21) Appl. No.: 14/002,863

(22) PCT Filed: Feb. 24, 2012

(86) PCT No.: PCT/EP2012/000795
§ 371 (c)(1),
(2), (4) Date: Oct. 24, 2013

(87) PCT Pub. No.: WO2012/116795
PCT Pub. Date: Sep. 7, 2012

(65) Prior Publication Data
US 2014/0248077 A1    Sep. 4, 2014

(30) Foreign Application Priority Data
Mar. 3, 2011 (DE) .................. 10 2011 005 004

(51) Int. Cl.
*B23K 26/24* (2014.01)
*B23K 26/242* (2014.01)
(Continued)

(52) U.S. Cl.
CPC ........... *B23K 26/242* (2015.10); *B23K 26/03* (2013.01); *B23K 26/032* (2013.01);
(Continued)

(58) Field of Classification Search
CPC .... B23K 26/03; B23K 26/032; B23K 26/044; B23K 26/24; B23K 26/242; B23K 31/125;
(Continued)

(56) References Cited

U.S. PATENT DOCUMENTS 4,907,169 A * 3/1990 Lovoi .................. B23K 26/04
219/124.34
5,883,937 A    3/1999 Schmitt
(Continued)

FOREIGN PATENT DOCUMENTS

AT         505004 A4   10/2008
DE      69127121 T2    12/1997
(Continued)

OTHER PUBLICATIONS

Machine translation of Japan Patent document No. 2001-246,486, Oct. 2016.*
(Continued)

*Primary Examiner* — Geoffrey S Evans
(74) *Attorney, Agent, or Firm* — Westman, Champlin & Koehler, P.A.

(57) ABSTRACT

The invention relates to a method for monitoring a lateral offset of an actual weld seam configuration relative to a desired weld seam configuration in particular in the motor vehicle sector, comprising the following steps: a) providing at least a first structural part having a geometric deviation in the region of the desired weld seam configuration; b) guiding a laser beam along the first structural part to produce a weld seam, forming a melt pool, thereby producing the actual weld seam configuration; and c) detecting a reflection from the melt pool simultaneously with step b).

12 Claims, 4 Drawing Sheets

(51) Int. Cl.

| | |
|---|---|
| *B23K 26/03* | (2006.01) |
| *B23K 31/12* | (2006.01) |
| *B23K 33/00* | (2006.01) |
| *B23K 26/044* | (2014.01) |
| *B23K 101/00* | (2006.01) |
| *B23K 101/18* | (2006.01) |
| *B23K 103/04* | (2006.01) |

(52) U.S. Cl.
CPC ............ *B23K 26/044* (2015.10); *B23K 26/24* (2013.01); *B23K 31/125* (2013.01); *B23K 33/008* (2013.01); *B23K 2201/006* (2013.01); *B23K 2201/18* (2013.01); *B23K 2203/04* (2013.01); *Y10T 403/478* (2015.01)

(58) Field of Classification Search
CPC .. B23K 33/008; B23K 26/26; B23K 2201/18; B23K 2201/006
See application file for complete search history.

(56) References Cited

U.S. PATENT DOCUMENTS

| | | | | |
|---|---|---|---|---|
| 7,906,744 | B2* | 3/2011 | Rippl | ................ B23K 26/0884 219/121.63 |
| 2004/0069754 | A1* | 4/2004 | Bates | .................... B23K 26/03 219/121.63 |
| 2006/0175301 | A1* | 8/2006 | Rippl | ................ B23K 26/0884 219/121.63 |

FOREIGN PATENT DOCUMENTS

| | | |
|---|---|---|
| DE | 102006030061 A1 | 1/2005 |
| DE | 10346264 A1 | 4/2005 |
| DE | 102004043076 A1 | 4/2005 |
| DE | 102007030395 A1 | 1/2009 |
| DE | 102008025646 A1 | 12/2009 |
| EP | 0770445 A2 | 5/1997 |
| EP | 1944119 A1 | 7/2008 |
| EP | 2075098 A2 | 7/2009 |
| JP | S61-148470 U | 9/1986 |
| JP | H64-87090 A | 3/1989 |
| JP | H04-118 192 A | 4/1992 |
| JP | 9-85451 A | 3/1997 |
| JP | 2000263266 A | 9/2000 |
| JP | 2001-246486 A | 9/2001 |
| JP | 2001-246486 A * | 9/2011 |
| KR | 20-1998-0044080 A | 9/1998 |
| KR | 10-2003-0089896 A | 5/2002 |

OTHER PUBLICATIONS

Korean Office Action for Korean Patent Application No. 10-2015-7019372, dated Oct. 2, 2015, 5 pages.
Notification of Reasons for Refusal for Japanese Patent Application No. 2013-555783, dispatch date of Aug. 26, 2014, 5 pages.
Office Action for Korean Patent Application No. 10-2013-7025873, dated Sep. 24, 2014, 13 pages.
Office Action for German Patent Application No. 11 2012 001 076.0, dated Feb. 13, 2015, 10 pages.
The International Search Report for PCT Application No. PCT/EP2012/000795, dated Jul. 4, 2012.
The German Search Report for German Application No. 102011005004.3, dated Nov. 9, 2011.

* cited by examiner

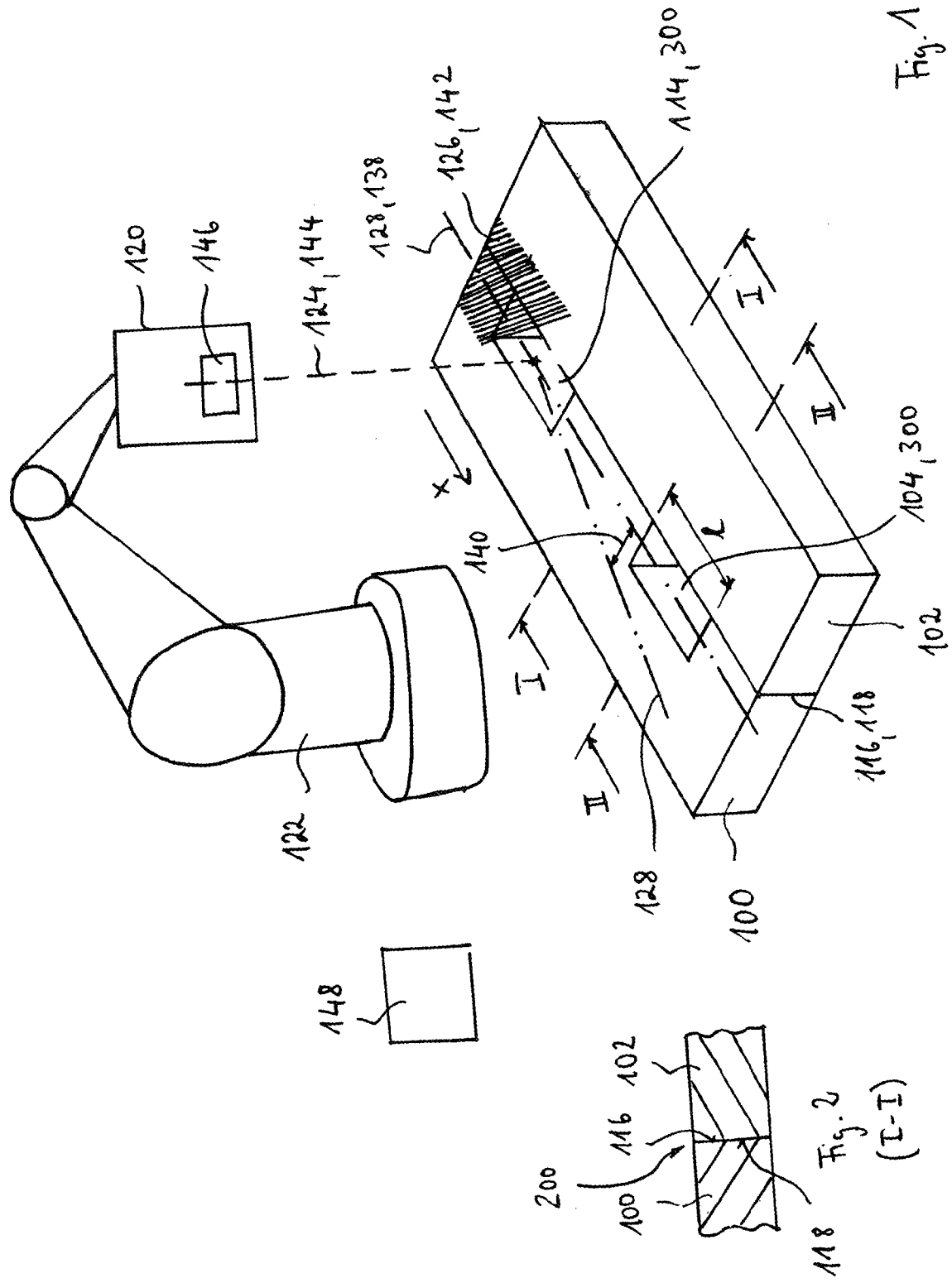

(II-II)

METHOD FOR MONITORING A LATERAL OFFSET OF AN ACTUAL WELD SEAM CONFIGURATION RELATIVE TO A DESIRED WELD SEAM CONFIGURATION, ASSEMBLY AND MOTOR VEHICLE SEAT

CROSS-REFERENCE TO RELATED APPLICATIONS

This Application is a Section 371 National Stage Application of International Application No. PCT/EP2012/000795, filed on Feb. 24, 2012 and published as WO 2012/116795 A1 on Sep. 7, 2012, in German.

FIELD OF THE INVENTION

The invention relates to a method for monitoring a lateral offset of an actual weld seam path relative to a target weld seam path, to an assembly and to a motor vehicle seat.

TECHNICAL BACKGROUND

In particular in the motor vehicle sector, it is often necessary to join together steel sheets or plates by welding. In this context, a corresponding weld seam is typically produced at a joint between two sheets which are to be joined together. Nowadays, a laser is often used for producing the weld seam. For the quality of the weld seam produced, it is of decisive importance that the laser beam of the laser exactly follows the joint or the gap between the sheets which are to be joined, that is to say a corresponding lateral offset between an actual weld seam path and a target weld seam path is kept to a minimum.

The prior art provides various solutions for keeping the lateral offset to a minimum.

A first solution provides gripping the sheets which are to be joined in a welding device very exactly and always displacing the laser in the same manner relative to the welding device so as to produce the weld seam. This is a cost-effective approach, since no electronics are required for monitoring the lateral offset. However, a drawback is that tolerances in the geometry of the sheets which are to be joined, or indeed tolerances which result from slightly different gripping positions of the sheets in the welding device, cannot be compensated. There may thus even be a large lateral offset in some cases.

Further solutions for minimising the lateral offset are disclosed for example in document DE 691 27 121 T2. A solution disclosed therein provides the use of contact probes, which follows the joint between the two sheets. However, contact probes of this type often lose contact with the corresponding joint, placing the quality of the weld seam at risk. In general, systems of this type are limited to low welding speeds and special applications. Moreover, the contact probes are sensitive to heat and wear, and this can result in them failing.

DE 691 27 121 T2 further discloses a visual detection system, which detects and corrects the actual weld seam path in comparison with the component position. Systems of this type have the drawback of being very complex and thus cost-intensive.

SUMMARY OF THE INVENTION

The object of the present invention is therefore to provide a method for monitoring a lateral offset of an actual weld seam path relative to a target weld seam path, in particular in the motor vehicle sector, which on the one hand makes it possible to detect the lateral offset sufficiently exactly and on the other hand is comparatively cost-effective. Moreover, an improved assembly and an improved seat are to be provided.

This object is achieved by a method in accordance with one or more embodiments described herein, by an assembly formed in accordance with one or more embodiments described herein, and by a motor vehicle seat formed in accordance with one or more embodiments described herein.

Accordingly, a method for monitoring a lateral offset of an actual weld seam path relative to a target weld seam path, in particular in the motor vehicle sector, comprising the following steps:

a) providing at least a first component with a geometric deviation in the region of the target weld seam path;

b) guiding a laser beam along one component to produce a weld seam with the formation of a weld pool, resulting in the actual weld seam path;

c) detecting a reflection from the weld pool simultaneously with step b).

An assembly, in particular in the motor vehicle sector, is further provided, comprising at least a first and a second component which are connected by means of a weld seam produced by the laser welding method, the weld seam comprising along the path thereof at least one indentation, which is associated with a welded-over geometric deviation so as to monitor a lateral offset of an actual weld seam path relative to a target weld seam path in the first and/or second component.

A motor vehicle seat comprising the assembly according to the invention is further provided.

The idea behind the present invention is to provide geometric deviations in the target weld seam path. If these geometric deviations are travelled over by the laser, this results in a change in the reflection which is detected. If a change of this type is detected, in the simplest case a warning can be outputted to a worker. Alternatively, however, the actual weld seam path may be corrected in that the laser beam and a gripping device, in which the first component and optionally the second component are gripped, are moved relative to one another in such a way that the actual weld seam path follows the target weld seam path again.

As a result of the reflection being detected, no complex visual system is required for tracking the joint between the two components as described at the outset. Further, no contacting means, such as the contact probe mentioned at the outset, is required. Further, a lateral offset between the actual weld seam path and the target weld seam path can reliably be detected.

The dependent claims provide advantageous embodiments of the invention.

"Lateral offset" refers to an offset of the actual weld seam path transverse to the target weld seam path.

Quite generally, as a function of the detected reflection, the welding process can be interrupted, the actual weld seam path can be corrected, a warning signal can be outputted, for example to a worker, and/or the welded components can automatically be disposed of.

In principle, it is also possible to apply the method according to the invention to just one component, for example if electro-surfacing seam is to be produced on the first component. "Electro-surfacing" refers to coating the component by welding.

In accordance with one embodiment of the method according to the invention, the geometric deviation is provided in the region of an edge of the first component. This is advantageous in particular if the edge of the first component is to be connected to a second component at the joint.

In accordance with a further embodiment of the method according to the invention, the geometric deviation is produced by mechanical machining, in particular by a chip-removing process, more preferably by milling, punching, turning, grinding, sawing and/or cutting. Alternatively, the geometric deviation may be produced when the first component is originally formed, for example cast. The above-disclosed methods for producing the geometric deviation are simple to carry out.

In accordance with a further embodiment of the method according to the invention, the geometric deviation is configured in the form of one or more recesses along the target weld seam path. The recess may for example be in the form of a continuous rectangular recess, in particular in the region of the edge of the first component, or in the form of a hole. The depth of the recess in the first component is preferably at least 0.3 mm with a maximum diameter of the laser beam in the region of the weld pool of preferably 0.9 mm. More preferably, the laser beam diameter in the region of the weld pool is 0.2-0.6 mm "Depth" refers to the extent of the recess in a direction transverse to the movement direction of the laser beam and within a plane substantially perpendicular to the laser beam. As a result of the dimensioning proposed above, the reflection from the weld pool is sufficiently affected, when the laser beam travels over the recess, for this effect to be detectable by an evaluation means. If the depth of the recess is less than 0.3 mm, it is possible that the corresponding effect on the reflection will not stand out sufficiently from other effects, for example resulting from the varying material constitution of the first component along the actual weld seam path. An excessively large diameter of the laser beam would mean that the laser beam would travel over the geometric deviation and the corresponding effect on the reflection would also be detected. In this case, the lateral offset between the actual weld seam path and the geometric deviation and thus the target weld seam path can be considerable. That is to say, as seen in the beam direction, only an edge region of the laser beam overlaps with the recess.

In accordance with a further embodiment of the method according to the invention, the edge comprises the recess and the recess penetrates the first component in the thickness direction thereof, the thickness of the edge preferably being less than or equal to 4 mm, the depth of the recess being at least 0.3 mm and/or the length being 2 to 10 mm. This measure also ensures a sufficient effect on the reflection.

In accordance with a further embodiment of the method according to the invention, the edge comprises the recess and forms therewith a stepped region, the thickness of the edge preferably being greater than 4 mm and/or the depth of the recess being at least 0.3 mm, the width of the recess being at least 3 mm and/or the length being 2 to 10 mm. In the present document, "width" refers to the extent of the recess in the direction of the laser beam. This approach is particularly suitable for thick sheets, in which the sufficient effect on the reflection is ensured.

In accordance with a further embodiment of the method according to the invention, the first component is connected to the second component by way of the produced weld seam, the geometric deviation being provided in the region of a joint between the first and second components. Thus, preferably at least two components are joined together by the method according to the invention.

In accordance with a further embodiment of the method according to the invention, the weld seam is produced in the form of a flanged seam, T seam, fillet seam or I seam. These seams and the corresponding joint types thereof are well suited to the present invention.

In accordance with a further embodiment of the method according to the invention, a) for a fillet seam the recess is formed with a depth of 0.5-0.8 mm and a length of 2-10 mm, b) for a flanged seam the recess is formed with a depth of 0.5-1 mm and a length of 2-10 mm, or c) for an I seam or T seam the recess is formed with a depth of 0.3 to 0.6 mm and a length of 2-10 mm, the diameter of the laser beam in the region of the weld pool being 0.2-0.6 mm. By means of the above dimensions, the aforementioned sufficient effect on the reflection can be achieved. Moreover, with a greater length of the recess of up to 10 mm an oncoming lateral offset can be reliably detected. Further, since the length of the recess should not be more than 10 mm, excessive machining effort to produce the recess and excessive weakening of the first component are avoided.

In accordance with a further embodiment of the method according to the invention, the reflection is detected by means of a detection means, in particular by means of a photodiode, in the beam path of the laser beam, the reflection having a wavelength of 400-700 nm. Advantageously, a detection means of this type is already regularly present on commercially available lasers, for detecting other welding parameters, for example the welding temperature. Advantageously, this pre-existing detection means is used for monitoring the lateral offset.

The aforementioned effect on the reflection is in particular in the form of an alteration to the spectrum, preferably a change in the intensity of the reflection at particular frequencies.

In accordance with a further embodiment of the assembly according to the invention, it is provided that a plurality of the indentations are provided, and are associated with different welded-over geometric deviations in the first and/or second component. "Indentation" refers in particular to a depression in the path of the weld seam.

In accordance with a further embodiment of the assembly according to the invention, it is provided that at least three of the indentations are provided and are at the same distance from one another.

In accordance with a further embodiment of the assembly according to the invention, it is provided that the one or more indentations are arranged in the region of a change of direction of the weld seam.

In the following, the invention is described in greater detail by way of the embodiments shown in the figures of the drawings, in which:

BRIEF DESCRIPTION OF THE DRAWINGS

FIG. 1 is a perspective view of a situation during the implementation of a method in accordance with an embodiment of the present invention;

FIG. 2 is a section I-I from FIG. 1;

In the drawings, like reference numerals denote like components, elements and features, unless otherwise specified.

DESCRIPTION OF EMBODIMENTS OF THE INVENTION

Figure 3A:
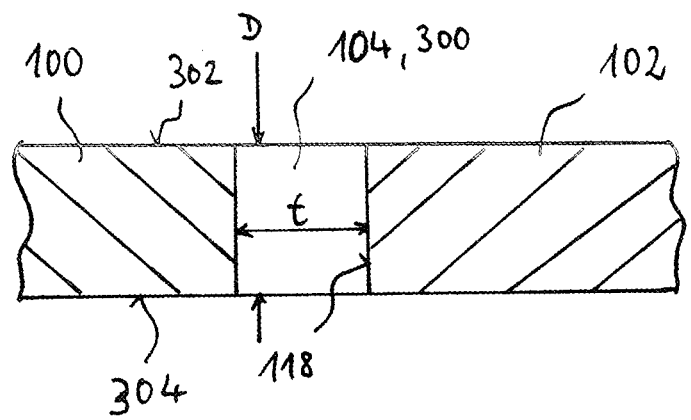
FIG. 3A is a section II-II from FIG. 1.

FIG. 1 shows a situation during a method in accordance with one embodiment of the present invention.

As is shown in a perspective view in FIG. 1, a first component 100 is arranged with a second component 102 in the butt joint 200 (see FIG. 2). In this context, FIG. 2 is a section I-I from FIG. 1.

The first and second components 100, 102 are preferably metal, in particular steel, sheets or plates.

The first component 100 comprises geometric deviations 104, 114 along the edge 116 thereof, which together with the opposing edge 118 of the second component 102 forms the butt joint 200. A respective geometric deviation 104, 114 is for example in the form of a rectangular recess 300, as shown in the section II-II of FIG. 3A, which continues fully from the upper side 302 to the underside 304 of the first component 100. The recess 300 is produced in the first component 100, for example by milling, before it is arranged in the joint 200 with the second component 102.

The recess 300 is preferably of a length l, see FIG. 1, of between 2 and 10 mm. Further, the recess 300 is of a depth t of at least 0.3 mm. The depth t is greatly exaggerated in the drawings for improved understanding. In the case of the continuous recess 300, the sheet thickness is preferably less than 4 mm.

Now returning to FIG. 1, a laser 120 is further shown therein and can be displaced in space, for example by means of a robot 122, so as to produce a weld seam 126 (merely indicated at the ends thereof) along the joint 200, which weld seam interconnects the first and second component 100, 102. In this context, the path of the weld seam 126 corresponds to an actual weld seam path 128, which in a first case is substantially coincident with a target weld seam path 138 and in a second case has a considerable lateral offset 140 relative to the target weld seam path 138. In the first case, the actual weld seam path 128 and the target weld seam path 138 are indicated by way of a single dot-chain line, because they are coincident. In the second case, the actual weld seam path 128 is indicated by way of a dashed line with two points.

The laser 120 is for example a YAG laser with a power of preferably 2 to 4 kW. The laser 120 produces the laser beam 124 at a diameter of the laser beam of between 0.2 and 0.6 mm in the region of the weld pool 142 (represented by the same shading as the weld pool 126).

Figure 4:
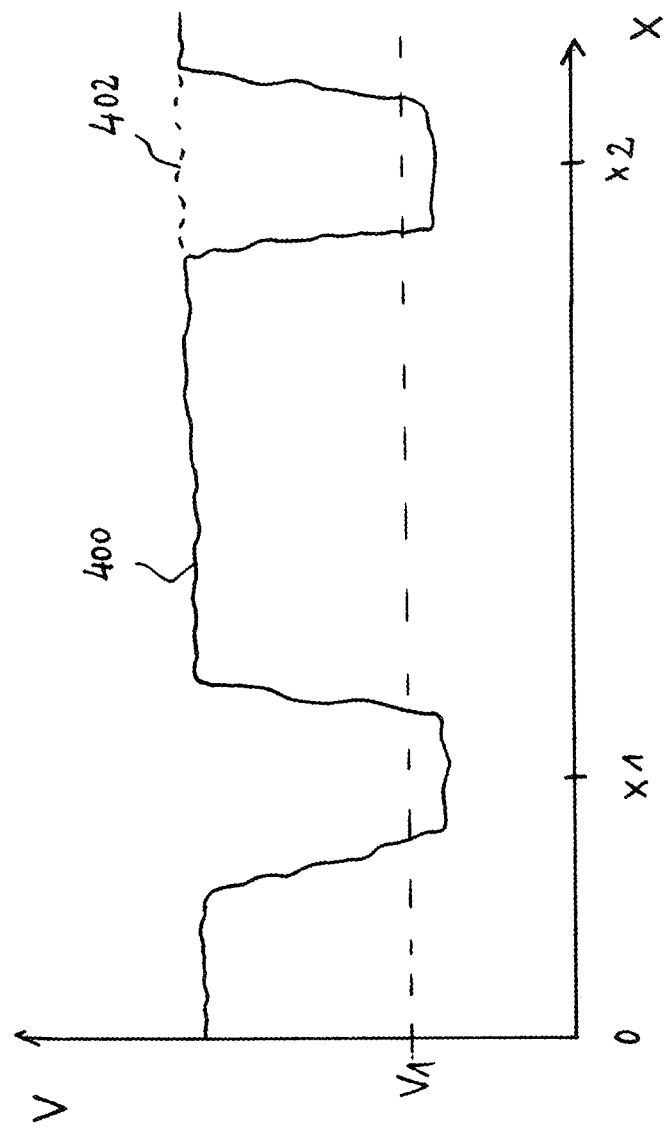
FIG. 4 is a diagram showing a voltage signal V generated by a photodiode as a function of the distance X.

After the first and second component 100, 102 have been clamped or laid in a welding device (not shown) (with the formation of the joint 200), the laser beam 124 is moved so as to produce the weld seam 126. At the same time, the reflection 144 of the laser light from the weld pool 142, which in the simplified drawing of FIG. 1 is coincident with the laser beam 124 and is therefore not shown in greater detail, is detected in a detection means, for example in the form of a photodiode 146, in the beam path of the laser beam 124. As a function of the spectrum of the detected reflection 144, the photodiode 146 generates an electric voltage signal 400, which is shown in FIG. 4. FIG. 4 shows the voltage signal 400 as a function of the distance X (see also FIG. 1) covered along the joint 200 by the laser beam 124.

As can be seen from FIG. 4, the voltage signal 400 decreases considerably in the region of the first recess 114, which is associated with the position X1 in FIG. 4. This is due to the change in the reflection 144, which it undergoes when the laser beam 124 arrives in the recess 114. Accordingly, the voltage signal 400 also decreases in the region of the second recess 104, with which the position X2 in FIG. 4 is associated. In the regions X1 and X2, the voltage signal 400 falls below a threshold V1, and this is detected by an evaluation means 148 (see FIG. 1). For example, in the present case, the evaluation means 148 can be provided in such a way that, if it detects that the level has twice fallen below the threshold V1, it does not output a warning signal to a worker and/or outputs the information "Weld Seam OK". In this case, the actual weld seam path 128 substantially corresponds to the target weld seam path 138, as shown by way of the dot-chain line in FIG. 1.

However, if the actual weld seam path 128 now departs from the target weld seam path 138, in such a way that they are at a significant lateral offset 140 from one another, as is indicated in FIG. 1 by the dashed line with two points, the laser beam 124 no longer sweeps over the second recess 104 or does so insufficiently. This may for example be because the position of the welding device (not shown) relative to the robot 122 has changed, because the first and second component 100, 102 are not gripped exactly in the welding device, or because the first and second component 100, 102 themselves have significant tolerances.

Since the laser beam 124 does not sweep over the second recess 104, no voltage decrease of the voltage signal 400 occurs in the region of the position X2 (see FIG. 4), as shown by the dashed line 402. If the evaluation means 148 now establishes that the level has only fallen below the threshold V1 once, it outputs a warning to a worker and/or outputs the information "Faulty Weld Seam".

In this way, it can easily be monitored that the lateral offset 140 between an actual weld seam path 128 and a target weld seam path 138 is kept to a minimum.

In accordance with another embodiment, the evaluation means 148 could also be coupled to the robot 122, and correct the position of the laser 124 accordingly if it establishes that the level has only fallen below one threshold V1

Figure 3B:
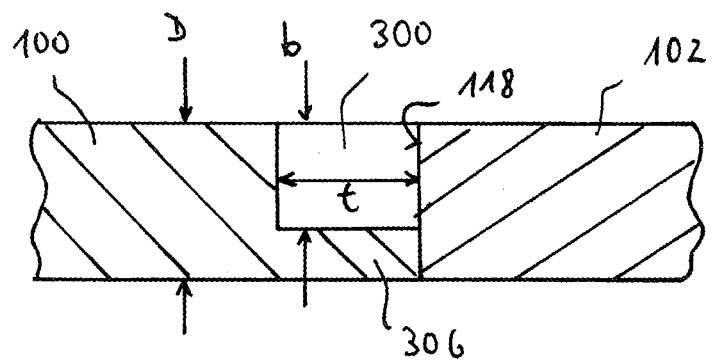
FIG. 3B-3D show different variants of the embodiment of FIG. 3A.

FIG. 3B shows an alternative embodiment of the recess 300. This is particularly suited to sheet thicknesses D>4 mm. In this case, the recess 300 only extends through the thickness D of the first component 100 in part, and thus forms a step 306 which reaches as far as the edge 118 of the second component 102. As in the embodiment of FIG. 3B, the depth t is in a range >0.3 mm. The width b by which the recess 300 extends into the first component 100 is preferably >3 mm.

FIGS. 3A and 3B preferably relate to the formation of an I weld seam starting from an I joint of the components 100, 102.

Figure 3C:
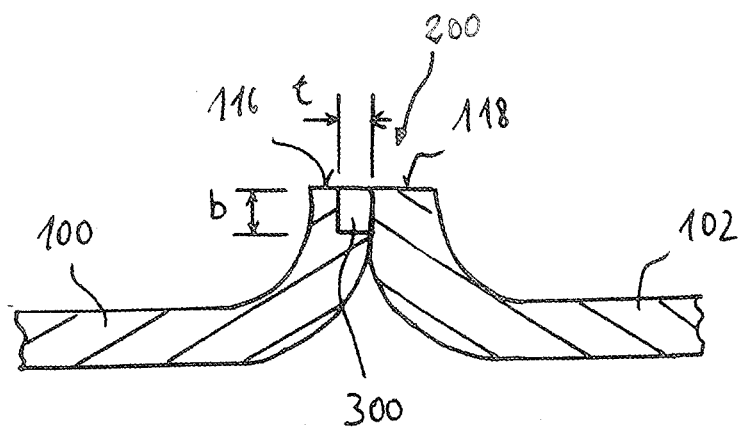

FIG. 3C shows the application of the above-disclosed method to a first and second component 100, 102 which together form a flanged joint 200 and are to be welded by means of a flanged seam. Preferably, the depth t of the recess 300 is between 0.5 and 0.8 mm and the length l (see FIG. 1) is between 2 and 10 mm. The width b is preferably >3 mm.

Figure 3D:
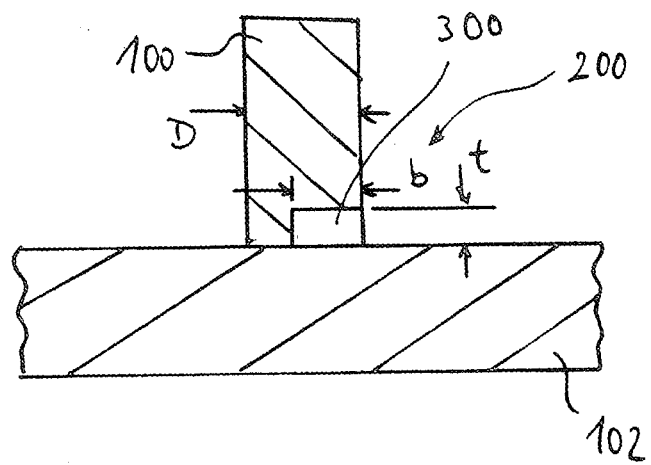

FIG. 3D shows a further variant on FIG. 3A, in which a first and second component 100, 102 are arranged in a T joint 200 relative to one another and a fillet seam is produced by the above-disclosed method. Preferably, in this case the recess 300 has a depth t of between 0.5 and 1 mm and a length l (see FIG. 1) of 2-10 mm. The width b is again preferably >3 mm. The thickness D of the first component 100 is preferably >4 mm.

Preferably, the first and second components 100, 102 are components from the motor vehicle sector. For example, the first component 100 may be in the form of a bracket, in particular a mounting bracket, more preferably a mounting bracket for a motor vehicle seat. The second component may be in the form of a rail, in particular a seat rail for a motor vehicle seat.

In accordance with a further embodiment, the geometric deviation 104 may also be in the form of a hole.

The weld seam 126 has a plurality of indentations (not shown), which are respectively associated with the welded-over recesses 300 in the first component 100.

Although the invention has been disclosed by way of preferred embodiments, it is not limited thereto, but can be modified in various ways. Further, the configurations and embodiments disclosed herein for the method according to the invention can be applied in an equivalent manner to the assembly according to the invention and the motor vehicle seat according to the invention, and vice versa. It should further be noted that in this document "a" does not exclude the possibility of a plurality.

LIST OF REFERENCE NUMERALS 100 first component
102 second component
104 geometric deviation
114 geometric deviation
116 edge
118 edge
120 laser
122 robot
124 laser beam
126 weld seam
128 actual weld seam path
138 target weld seam path
140 lateral offset
142 weld seam
144 reflection
146 photodiode
148 evaluation means
200 joint
300 recess
302 upper side
304 underside
306 step
400 voltage signal
402 voltage signal
b width
l length
t breadth
D thickness
V1 threshold
X1 threshold
X2 threshold

The invention claimed is:

1. An offset monitoring method configured for monitoring a lateral offset of an actual weld seam path relative to a target weld seam path, comprising:
providing at least a first component with a geometric deviation in the region of the target weld seam path;
guiding a laser beam along the first component to produce a weld seam with the formation of a weld pool, resulting in the actual weld seam path;
detecting a reflection from the weld pool simultaneously with the guiding a laser beam along the first component; and
detecting a change in the reflection when the laser beam travels over the geometric deviation.

2. The method of claim 1, wherein the geometric deviation is provided in the region of an edge of the first component.

3. The method of claim 1, wherein the first component is connected to a second component by way of the produced weld seam, the geometric deviation being provided in the region of a joint between the first and second components.

4. The method of claim 1, wherein the weld seam is produced in the form of a flanged seam, T seam, fillet seam or I seam.

5. The method of claim 1, wherein the reflection is detected by means of a detection device in the beam path of the laser beam.

6. The method of claim 1, wherein the geometric deviation is produced by mechanical machining, punching, turning, grinding, sawing or cutting.

7. The method of claim 1, wherein the geometric deviation is configured in the form of one or more recesses along the target weld seam path.

8. The method of claim 7, wherein:
the weld seam is produced in the form of a flanged seam, T seam, fillet seam or I seam, and for a fillet seam the recess is formed with a depth of 0.5-0.8 mm and a length of 2-10 mm, or for a flanged seam the recess is formed with a depth of 0.5-1 mm and a length of 2-10 mm, or for an I seam or T seam the recess is formed with a depth of 0.3 to 0.6 mm and a length of 2-10 mm, wherein the diameter of the laser beam in the region of the weld pool being 0.2-0.6 mm.

9. The method of claim 7, wherein the edge comprises the recess and the recess penetrates the first component in the thickness direction thereof.

10. The method of claim 9, wherein the thickness of the edge being less than or equal to 4 mm, the depth of the recess being at least 0.3 mm and the length of the recess being 2-10 mm.

11. The method of claim 7, wherein the edge comprises the recess and forms therewith a stepped region.

12. The method of claim 11, wherein the thickness of the edge preferably being greater than 4 mm or the depth of the recess being at least 0.3 mm, the width of the recess being at least 3 mm or the length of the recess being 2 to 10 mm.

* * * * *